United States Patent [19]
Boeve et al.

[11] Patent Number: 5,469,205
[45] Date of Patent: Nov. 21, 1995

[54] IMAGE SCANNING APPARATUS

[75] Inventors: Gerard Boeve; Gentil Verbeke, both of Edegem, Belgium

[73] Assignee: Agfa-Gevaert N. V., Mortsel, Belgium

[21] Appl. No.: 102,221

[22] Filed: Aug. 5, 1993

[30]     Foreign Application Priority Data

Aug. 19, 1992 [EP]  European Pat. Off. .............. 92202540

[51] Int. Cl.$^6$ ..................................................... B41J 2/435
[52] U.S. Cl. ........................................................ 347/263
[58] Field of Search ........................... 347/263; 16/18 R, 16/45, 47

[56]                References Cited

U.S. PATENT DOCUMENTS 5,184,153  2/1993  Daniels et al. .

OTHER PUBLICATIONS

Schaff Piano Supply catalog, 1975, pp. 26,27.

*Primary Examiner*—Mark J. Reinhart
*Attorney, Agent, or Firm*—William J. Daniel

[57]                ABSTRACT

An image scanning apparatus has an apparatus sub-frame and a separate sub-frame which are adapted to rest upon a floor or like supporting surface independently of one another. The separate sub-frame includes a scanning station having means for scanning the thus-transported recording medium with a beam of radiation and the apparatus sub-frame has a conveyor for transporting an image recording medium towards and away from the scanning station. The apparatus sub-frame carries wheels which are adapted to be lowered into contact with the supporting surface in order to elevate the apparatus sub-frame above such surface. The apparatus and separate sub-frames have cooperating shoulders which are brought into abutment when the apparatus sub-frame is elevated and upon continued elevation of the apparatus sub-frame result in simultaneous elevation of the scanning station sub-frame above the supporting surface. The projections preferably are configured to bring about self-alignment of the two sub-frames relative to one another upon abutment thereof. The separate sub-frame preferably includes a separate conveyor for receiving the medium from the apparatus sub-frame conveyor and delivering the same to the scanning station to thereby isolate the scanning station from vibrations present in the apparatus sub-frame.

8 Claims, 3 Drawing Sheets

IMAGE SCANNING APPARATUS

BACKGROUND OF THE INVENTION

1. Field of the Invention

The present invention relates to image scanning apparatus having a scanning station mounted on a scanning station sub-frame which scanning station comprises means for transporting a recording medium and scanning means for scanning the thus-transported recording medium with a beam of radiation, there being also provided a separate sub-frame carrying additional means for transporting the recording medium towards and away from the scanning station.

Such scanning apparatus may take any of various specific forms depending on the specific nature of the purpose which it is to serve. The apparatus may be designed so that an image (whether latent or visible) is formed on the recording medium during such scanning, or it may be designed so that a pre-existing image carried by the recording medium is read during scanning so that it may be transferred to some other medium. Purely by way of example, in the photo-copying field, the scanning beam could be a beam of visible light and the radiation collecting means could be arranged to collect light reflected from a visible image borne by the recording medium. Alternatively, the beam could be a thin pencil of laser radiation which scans the recording medium transversely of its direction of transport through the scanning station. In such cases, the radiation collecting means could be arranged to collect light reflected from a visible image of the recording medium, or, given a suitable recording medium, the radiation collecting means could be arranged to collect light emitted from a latent image carried by the recording medium in response to the incidence of the laser beam. Such recording media are used in photo-stimulable luminescence ("PSL") radiography.

In the PSL radiographic system, a PSL. X-ray plate has applied thereto a layer of a photostimulable luminescent material which comprises a phosphor, for example a europium-activated barium fluorohalide, and a binder. The phosphor has the characteristic of being energised to an excited state by X-rays, and can then be stimulated by visible or infra-red light to return to the ground state with the emission of visible light (of a different wavelength from the stimulating light). The excited state has a half-life of at least several hours or days in the absence of stimulating light. A PSL plate is potentially re-usable many times. The technique is described in an article by Sonoda et al. in Radiology, Volume 148 (September 1983), at pages 833 to 838, and it offers the potential advantages of better image resolution at lower X-ray dosages for the patient.

The present invention was made with specific reference to the scanning of PSL radiographic plates, but the underlying principle may also be applied to other image scanning systems, for example in the fields of photocopying and the digital encoding of images for computer storage or manipulation or for transmission by wire or wireless means.

A major problem confronting the user of image scanning apparatus is the transmission of vibrations to the recording medium during actual scanning thereof. The problem is perhaps at its most severe in the case of continuous feed apparatus where a succession of discrete pieces of recording medium are being fed through the apparatus, and where several operations are required to be performed in the apparatus. For example, one could envisage an integrated apparatus for digitally encoding the information carried by a conventional X-ray plate which comprised means for removing an exposed photographic plate from a cassette and for developing and fixing the photographic image, for drying and then scanning the plate, and for ejecting the scanned plate and the used cassette, possibly reloaded with a fresh X-ray plate, all with associated transport mechanisms. It will readily be appreciated that all this mechanical activity could give rise to quite considerable vibration in the apparatus and that this could adversely affect the scanning resolution and reliability.

DESCRIPTION OF THE PRIOR ART

Various proposals have been made to reduce the amount of vibration which is transmitted to the scanning station. For example U.S. Pat. No. No 4,417,260 (Kawai et al. assigned to Fuji Photo Film Co Ltd) describes and claims an image scanning system for two-dimensionally scanning a light beam across a recording medium comprising a feeding and discharging means for feeding the recording medium to a scanning position and discharging it therefrom, a sub-scanning means for feeding the recording medium in the sub-scanning direction at the scanning position, and a light beam scanning means for scanning the light beam in the main scanning direction at the scanning position, the light beam scanning means comprising a light source for emitting the light beam and a light deflecting means for deflecting the light beam to sweep the recording medium on the sub-scanning means in the main scanning direction, characterized in that said light source, light deflecting means and the sub-scanning means are mounted on a single inner frame which is mounted by a vibration insulator on an outer frame on which said feeding and discharge means is mounted.

As a vibration insulator, a combination of springs and dampers is specifically described and illustrated, though reference is also made to other types of vibration insulator such as a rubber vibration insulator, a static pressure bearing and a magnetic bearing. Such vibration insulators will of course add to the cost of the apparatus. A problem arises with such systems in that the more effective is the vibration insulator, the more sensitive it will be to shocks and overloading, for example if it is required to move the image scanning apparatus to a new location, and accordingly there may also be a requirement for some means of locking the various frames together before the apparatus is moved. Such locking means will add further to the cost of the apparatus and there is always the danger that whoever moves the apparatus may forget to activate such locking means.

EP A2 0235 618 discloses a copier for sheet film with a laser recorder in which a scanning station sub-frame and a separate apparatus frame are adapted and arranged to rest upon a floor independently of the other.

U.S. Pat. No. 4,833,325 teaches an image read out apparatus in which the casing frame of the apparatus directly rests on the floor whereas a base panel supporting the image readout mechanism is mounted via vibro-isolating means on the floor, independently of the housing.

DESCRIPTION OF THE INVENTION

Object of the Invention

It is an object of this invention to provide an image scanning apparatus having a scanning station which is well insulated from vibrations arising in other parts of the apparatus, and which can be readily mechanically coupled with said apparatus for purposes of displacement or transport of the apparatus.

SUMMARY OF THE INVENTION

According to the present invention, there is provided an image scanning apparatus having an apparatus sub-frame carrying means for transporting a recording medium towards and away from a scanning station, and a scanning station mounted on a scanning station sub-frame which scanning station comprises means for transporting a recording medium and scanning means for scanning the thus transported recording medium with a beam of radiation, said scanning station sub-frame and said apparatus sub-frame being each adapted and arranged to rest upon a floor independently of the other, characterised in that said apparatus sub-frame carries wheels which are adapted to be lowered into contact with such floor in order to jack up or i.e., elevate that sub-frame, and wherein said sub-frames have shoulders which are arranged to come into contact during jacking of the wheeled sub-frame whereby jacking of said wheeled sub-frame effects jacking of the scanning station sub-frame of the apparatus.

It will be appreciated that there may inevitably be some connections between the scanning station sub-frame and the remainder of the apparatus. Such connections may be, and for the best results are, confined to electrical leads for supplying power to the radiation source, to a device which causes the beam of radiation to scan across the recording medium, and to the scanning station transport means, and for the collection of any signals generated on such scanning. Such leads may be kept as thin as is consistent with the purpose which they have to serve, and they may be hung in loops so that they themselves do not, in effect, transmit any vibration.

Apparatus according to the invention may incorporate any desired number of said sub-frames, but for the sake of simplicity of construction, there are two and only two such sub-frames, one carrying the scanning station and one carrying the remainder of the apparatus. In the remainder of this specification, it will be written as there were indeed only two said sub-frames.

The use of such lowerable wheels is a very simple way of lifting the non-wheeled sub-frame for movement of the apparatus, for example from one room of a building to another. The scanning station sub-frame is normally smaller than the apparatus sub-frame and is located wholly within it. Thereby stability of the structure during movement is high since it is the outer apparatus structure which carries said wheels.

Because the sub-frames rest on a floor independently, it may be that one such sub-frame could be faned in such a way as to disturb its position in relation to another sub-frame and thereby cause a mis-alignment of successive transport means such as conveyors with the result that processing of a recording medium might be interrupted. In order to alleviate this problem, it is preferred that said wheeled sub-frame and such other sub-frame(s) have mounted thereto co-operating pairs of projections and sockets therefor with at least one of the projection and socket of each such pair being at least partially tapered on a vertical axis, whereby on jacking, such projections and sockets mate to provide a self-locating effect for the sub-frames with respect to one another. It is then a very simple matter to jack the apparatus up using the wheels, and then lower the apparatus again, whereupon, correct alignment of the sub-frames will be re-established.

By way of example, one of said sub-frames may carry a plurality of conical projections which are paired with circular holes in plates carried by the other sub-frame. As the conical projections enter into their respective holes during jacking, any mis-alignment of the two sub-frames will be corrected by sides of the conical projections bearing against sides of the holes. In order to guard against too great a misalignment for correction in that way, the arrangement may be such that the projections penetrate part way into their sockets, though being out of contact therewith, when the sub-frames both rest upon the floor.

Such self-locating projections and sockets may provide the shoulders required for jacking of the sub-frames together as a unit, but it is presently thought that such an arrangement might lead to excessive stress concentration and wear and thus in time reduce the effectiveness or accuracy of the self-location. In order to distribute such stresses more evenly, it is preferred that said shoulders are provided by a channel member mounted on one said sub-frame and a projection mounted on another said sub-frame to project into the channel member between upper and lower walls thereof, the arrangement being such that when both sub-frames rest on a floor, the projection and channel member are out of contact, whereas lowering of the wheels brings the projection into contact with an upper or lower wall of the channel member whereupon further lowering of said wheels effects jacking of the non-wheeled sub-frame.

Advantageously, said apparatus is enclosed within a substantially light-tight cabinet. This greatly increases the versatility of the apparatus and it may then be used for the scanning of light-sensitive recording media during daylight illumination of a room in which the apparatus is located. In order to promote light-tightness of the cabinet, it is preferred that said channel member and projection are so constructed as to provide a light-trap.

In order to reduce vibration sources inherent to the scanning station to a minimum, it is preferred that the only moving parts carried by said scanning station sub-frame are said scanning means and said means for transporting the recording medium through the scanning station.

As mentioned hereinbefore, the scanning apparatus of the invention may be used for imaging to a recording medium, but it is envisaged that its greatest use will be in the field of reading a pre-recorded image on a recording medium. To that end, preferred embodiments of the invention provide that he scanning station further comprises means for collecting radiation from the scanned recording medium. Such radiation from the scanned recording medium may be simply a reflection of the scanning radiation beam, modulated by a visible image on the recording medium, or it may be luminescence whose emission is stimulated by the scanning radiation. For example it is envisaged that apparatus according to this invention will be of particular use in the field of photo-stimulable luminescence (PSL) radiography, and it is accordingly preferred that the scanning station is adapted for scanning a plate of the type used in photo-stimulable luminescence (PSL) radiography.

BRIEF DESCRIPTION OF THE DRAWINGS

A preferred embodiment of this invention will now be described with reference to the accompanying diagrammatic drawings in which.

DETAILED DESCRIPTION OF A PREFERRED EMBODIMENT OF THE INVENTION

Figure 2:
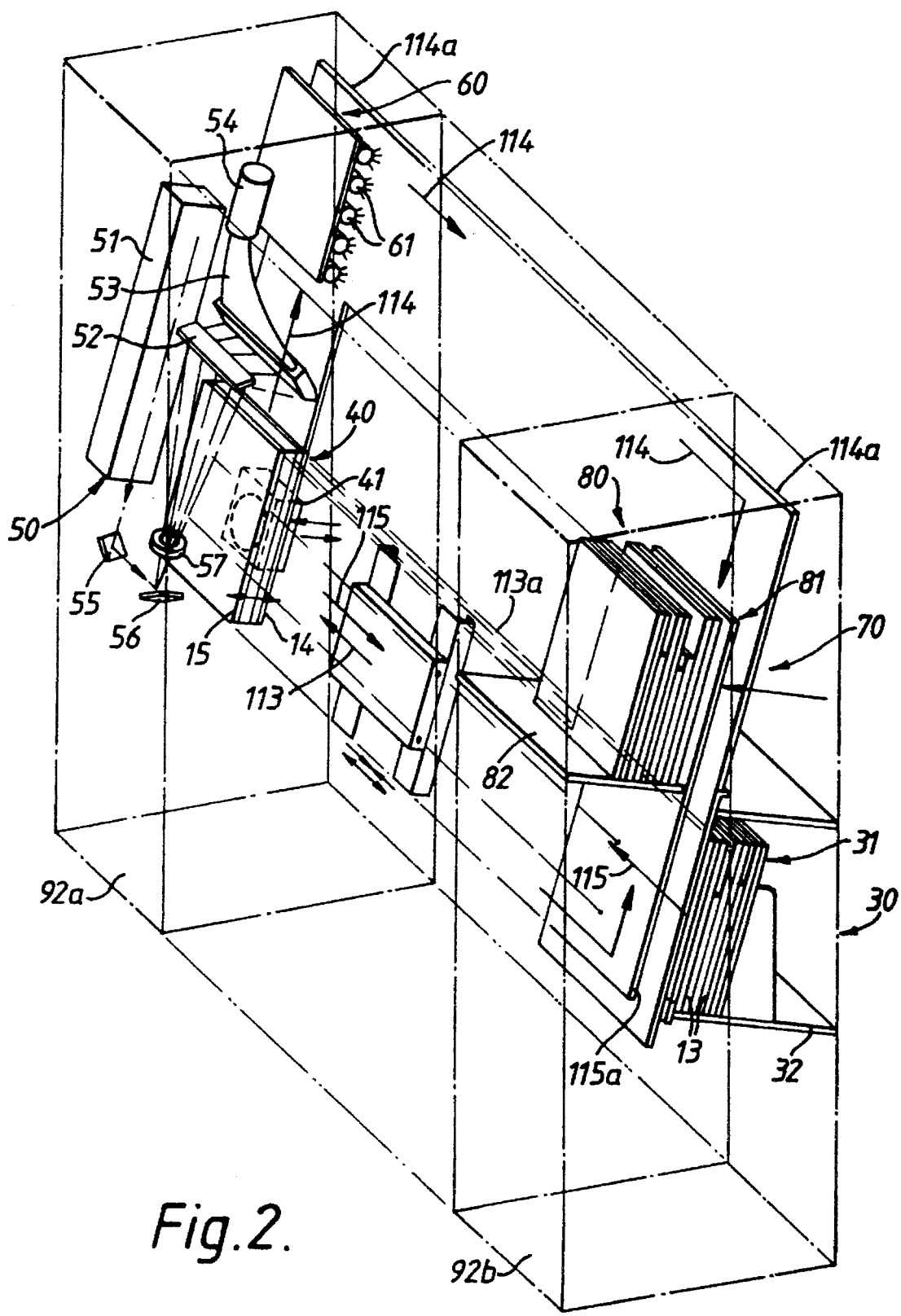
FIGS. 2 and 3 are schematic diagrams illustrating an entire scanning apparatus adapted for the scanning of a plate of a type used in PSL radiography.
Figure 3:
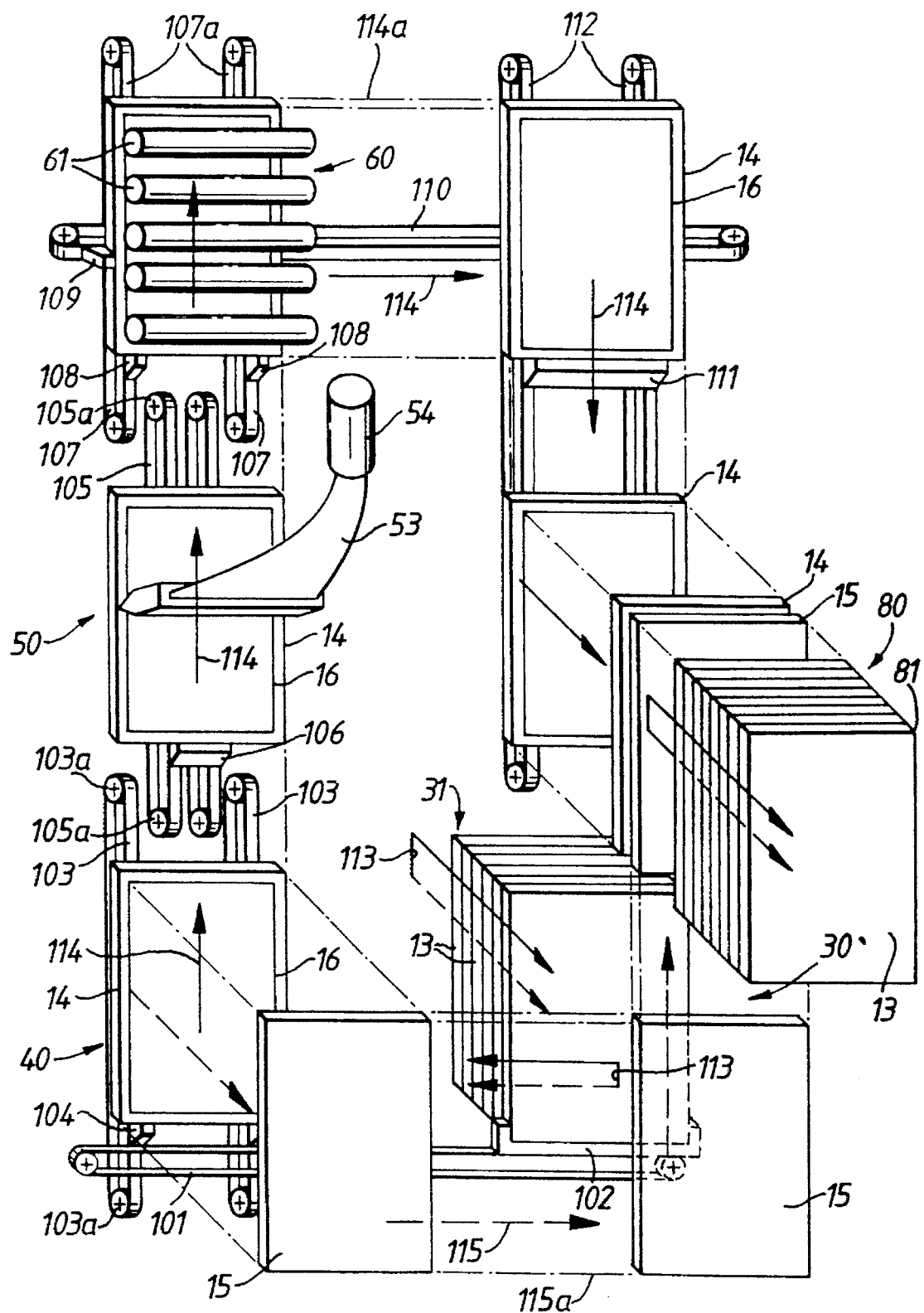

Referring first to FIGS. 2 and 3, PSL radiographic cassettes 13 comprising a base plate 14 having a layer of PSL material 16 (see FIG. 3) and a removable cover 15 are exposed in an X-ray machine and then brought to the scanning apparatus illustrated. On arrival at the scanning apparatus, the cassettes 13 are placed in a receiving station 30 in a stack 31. Successive cassettes 13 are transported from the receiving station 30 to a separating station 40 where the cover 15 is separated from the base plate 14.

The base plate 14 then follows a path 114 through the scanning station 50 and the erasing station 60. In the embodiment illustrated, this path 114 is such that the base plate 14 remains flat throughout, and indeed, it is transported in its own plane. In the scanning station 50, a layer of PSL material (not shown in FIG. 2, but shown at 16 in FIG. 3) on top of the base plate 14 is scanned by a beam from a laser 51 using a scanner mirror 52. This beam stimulates any excited PSL material an causes it to return to the ground state with the emission of light. This emitted light is picked up by a light guide 53 which consists of a bundle of optical fibres formed into a flat plate above the scan track of the beam from scanner mirror 52 at one end and a circular or otherwise compact bundle at the other end. That compact bundle is matched to a photo-detector 54 consisting of a photo-multiplier tube. The photo-detector 54 feeds a computer (not shown).

An erasing station 60 comprises a set of fluorescent tubes 61 past which the base plate 14 is moved. This subjects the PSL material on the top surface of the base plate to intense light, so discharging any remaining energisation of the PSL material and ensuring that it is completely returned to its ground state. The base plate 14 is then transported to an assembly station 70.

The cover 15 meanwhile follows a separate path 115 from the separating station 40 to the assembly station 70, this path 115 bypassing the scanning 50 and erasing 60 stations.

The cover 15 and base plate 14 are re-united in the assembly station 70 and are ejected together as a cassette 13 onto a stack 81 in an output station 80 of the apparatus.

In FIGS. 2 and 3, cassettes 13 are loaded into a stack 31 on a shelf 32 (FIG. 2) at the receiving station 30. Successive cassettes 13 are removed from the front of the stack 31 and are then taken along a path 113 to a separating station 40 (see especially FIG. 3) where the base plate 14 and cover 15 of the cassette 13 are separated. It is convenient for the apparatus to be arranged as shown in FIG. 2 so that the cassette parts and the paths they follow are inclined. In this way, the cassettes may rest on one or more conveyors, suitably belt conveyors, under gravity during their transport through the scanning apparatus. One arrangement of the various conveyors which may be used is shown in FIG. 3. The cassette base plate 14 leaves the separating station 40 in an upward direction along path 114 and passes through the scanning station 50, whereafter the base plate 14 continues its upward movement to or through an erasing station 60 before moving horizontally back to a position from which it can then move downwardly to an assembly station 70. Meanwhile, the cassette cover 15 is transported from the separating station along a path 115 which starts by being parallel to the initial common path 113 of the cassette parts. The cassette cover 15 is transported back in front of the receiving station 30 and is then moved upwardly to the assembly station 70 in which it is positioned in front of the just processed base plate 14. The base plate 14 is moved forwardly to engage the cover 15 and the thus re-assembled cassette 13 is ejected from the apparatus onto the rear of a stack 81 of cassettes on an output shelf 82 at an output station 80. The arrangement is such that throughout their transport, except at the separating station 40 and at the assembly station 70 and during ejection, each part 14, 15 of the cassette 13 is moved substantially in its own plane.

Referring now more particularly to FIG. 2, it is to be noted that a cabinet for the apparatus has been exploded into two portions 92a and 92b purely for clarity in the drawing. In practice, those two portions of the cabinet would be contiguous, indeed unitary, and the horizontal portions of the paths 113, 114, and 115 followed respectively by the cassette 13, the base plate 14 and the cover 15 would not be as long as is shown in the drawing. Also, it may be noted that reference numerals 113, 114, and 115 for those paths are applied to arrows representing the directions of those paths. Indications of the outlines of those respective paths are given by reference numerals 113a, 114a, and 115a. In the separating station 40, there is shown a holder 41 for the base plate 14 for holding that plate during its separation from its cover 15.

In the scanning station 50, laser 51 is arranged substantially parallel with the upward reach of the base plate path 114 and the beam fitted by that laser is deflected by a mirror 55 onto a vibrating (or rotating, e.g. multi-faceted rotating) mirror 56 which passes a scanning beam through a focusing lens 57 and thence to the scanner mirror 52 which directs the beam onto the PSL layer of the base plate 14 for stimulating emission of luminescence which is collected by the light guide 53. The focusing lens 57 is suitably aspherical and so designed that the point of impingement of the laser beam on the PSL layer moves at a constant velocity during scanning, and also so that that beam remains focused on that layer despite differences in the length of the light path during such scanning.

With more particular reference now to FIG. 3, the arrow indicating the path 114 for the base plate 14 has a solid line, the arrow indicating the path 115 for the cover 15 has a broken line, and the path of the assembled cassette 13 is indicated by paired broken line and solid line arrows 113. The front cassette 13 of the input stack 31 is taken up by a bracket 102 mounted for movement on a conveyor belt 101, and that cassette is conveyed horizontally in inclined position (cf. FIG. 2) to the separating station 40 where the cover 15 is separated from the base plate 14. After separation, the base plate 14 rests in the same inclined orientation against a pair of conveyor belts 103 which run between end pulley wheels 103a. The base plate 14 is supported by brackets 104 carried by those conveyor belts.

The base plate is conveyed upwardly along path 114 by the conveyors 103 and is transferred to a further pair of conveyors, the scanning station conveyors, 105 on which the base plate 14 rests supported by a bracket 106 carried by those conveyors. The scanning station conveyors 105 run between end pulley wheels 105a and transport the base plate 14 through the scanning station 50. The various parts 51 to 57 (FIG. 2) in the scanning station 50 and the scanning conveyors 105 are mounted on a separate sub-frame 121 (see FIG. 1) which is mounted to a main frame 122 (also in FIG. 1) of the apparatus in such a way as to minimise the transfer of vibrations to the base plate 14 during the actual scanning period.

After scanning of its PSL layer 16, the base plate 14 is picked up by a third upwardly running pair of conveyors 107 on which it rests on brackets 108, and a fourth pair 107a of upwardly running conveyors which are arranged as an extension of conveyors 107. While supported by conveyors 107, 107a, the PSL layer 16 of the base plate 14 is exposed to fluorescent tubes 61 in the erasing station 60 in order to return the PSL material to its ground state. After a sufficient time to effect such erasure, the base plate is picked up by a bracket 109 mounted on a horizontally running conveyor 110 (see FIG. 3) which runs between the third and fourth upwardly running conveyors 106, 108. The erased PSL base plate 14 is thus transported along a horizontal section of its path 114 (also indicated here in outline at 114a) along a shelf (not shown) to a bracket 111 mounted on a pair of downwardly running conveyors 112. The plate 14 is transported down by the conveyors 112 to the assembly station 70 where it in brought forward and re-united with its cover 15 which has meanwhile been transported along path 115, 115a from the separating station 40. The re-assembled cassette 13 is then ejected onto the output stack 81.

Figure 1:
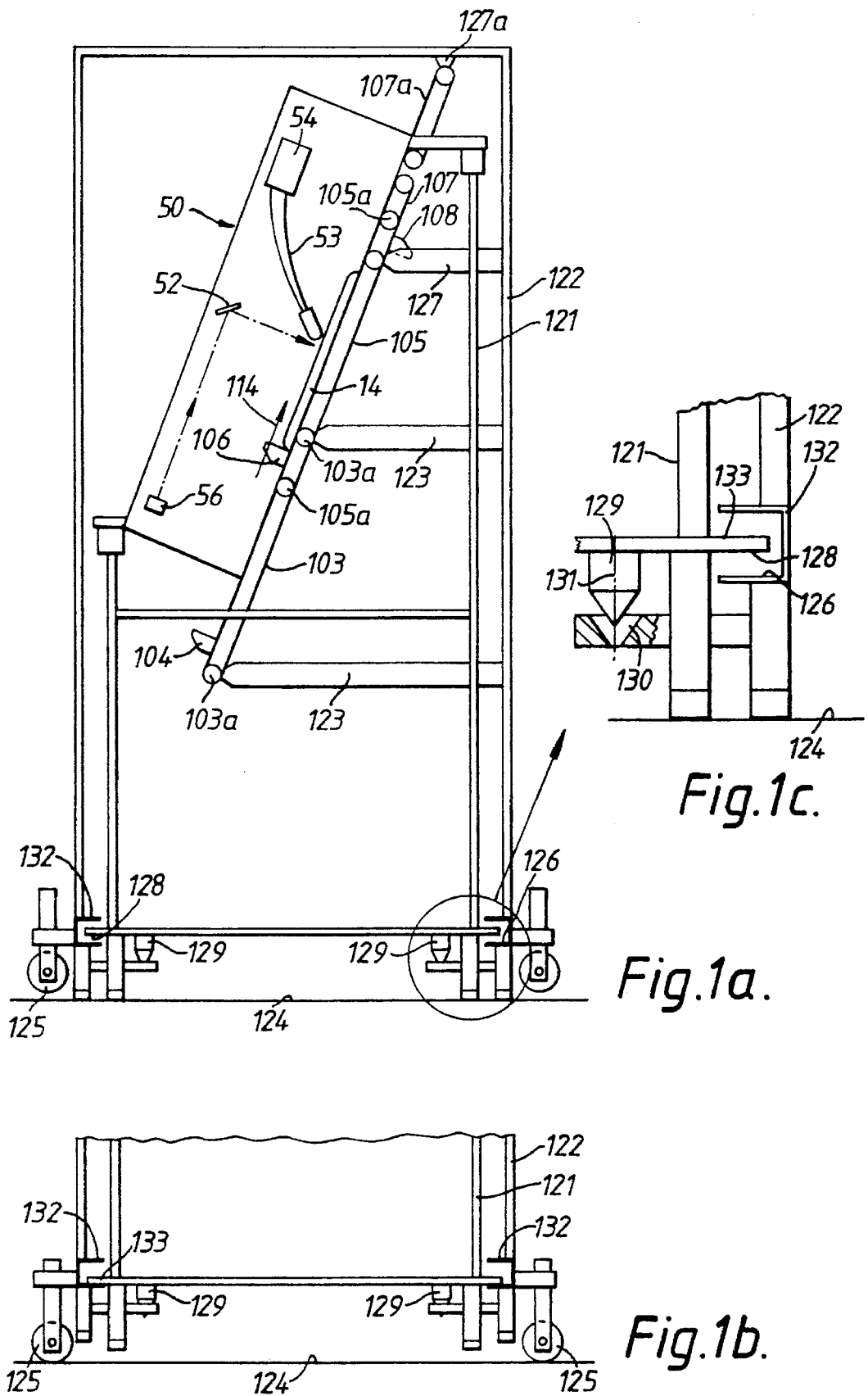
FIG. 1a is a schematic end view of an embodiment of apparatus in accordance with this invention comprising a pair of sub-frames each of which is resting on a floor.
FIG. 1b is a detail view of a lower part of FIG. 1a showing a part of a self-locating mechanism.
FIG. 1c is a detail view of the lower part of FIG. 1a with the two sub-frames raised off the floor.

Reverting now to FIGS. 1, there is shown the main sub-frame 122 of the apparatus, and the scanning station sub-frame 121 which carries the scanning apparatus as such and the scanning station conveyor 105. Other conveyors shown are those with reference numerals 103 and 107, 107a, respectively for transporting the plate 14 towards and away from the scanning station. These other conveyors are respectively mounted to the main sub-frame 122 using brackets 123 and 127, 127a respectively so that they are not mechanically linked to the sub-frame 121.

The two sub-frames 121, 122 rest independently on a floor 124 when the apparatus is in use as shown in FIG. 1a.

One sub-frame, the main sub-frame 122, carries wheels 125 which are lowerable into contact with the floor 124 in order to jack up that sub-frame, and the two sub-frames 122, 121 are provided with co-operating shoulders 126, 128 which are arranged to come into contact during jacking of the main, wheeled sub-frame whereby jacking of that wheeled sub-frame effects jacking of the scanning station sub-frame 121.

The main, wheeled sub-frame 122 and the scanning station sub-frame 121 have mounted thereto co-operating pairs of projections 129 and sockets therefor 130, as is best seen in FIG. 1c. At least one of the projection 129 and socket 130 of each such pair is at least part tapered with a vertical axis 131, whereby on jacking, such projections 129 and sockets 130 inter-engage to provide a self-locating effect for the two sub-frames with respect to one another.

The jacking shoulders 126, 128 of the two sub-frames 122, 121 are provided by a channel member 132 mounted respectively on the main sub-frame 122 and a projection 133 mounted on the other, scanning, sub-frame 121, to project into the channel member 132 between upper and lower walls thereof. The arrangement is such that when both sub-frames rest on the floor 124, as shown in FIGS. 1a and 1c, the projection 133 and channel member 132 are out of contact, whereas lowering of the wheels 125 brings the shoulder formed by the projection 133 into contact with the shoulder 126 formed by the lower wall of the channel member 132. Thereafter, further lowering of the wheels 125 effects jacking of the non-wheeled, scanning station sub-frame 121.

The channel member 132 and projection 133 are thus constructed as to provide a light-trap, the effectiveness of which may be promoted by painting the projection 133 and channel member 132 black, or by coating them with black flock.

In the embodiment illustrated, the only moving parts carried by the scanning station sub-frame 121 are the scanning means as such, in particular rotating or galvanometer mirror 56, and the scanning station conveyor 105, its pulley wheels 105a and its drive motor (not shown) for transporting the recording medium through the scanning station. All other moving parts of the apparatus are carried by the main sub-frame 122 of the apparatus.

Such other moving parts of the apparatus carried by the main sub-frame 122 of the apparatus include various conveyors designated by reference numerals 101, 103, 107, 107a, 110, and 112, and their associated drives, and actuators for separating the cassette base 14 from its cover 15 and for re-assembling them, in the separating station 40 and the assembly station 70 respectively.

We claim:

1. Image scanning apparatus having an apparatus sub-frame carrying means for transporting a recording medium towards and away from a scanning station, and a scanning station mounted on a scanning station sub-free which scanning station comprises means for transporting a recording medium and scanning means for scanning the thus-transported recording medium with a beam of radiation, said scanning station sub-frame and said apparatus sub-frame being each adapted and arranged to rest upon a floor independently of the other, characterised in that said apparatus sub-frame carries wheels which are lowerable into contact with a said floor in order to jack up that sub-frame, and wherein said sub-frames have shoulders which are arranged to come into contact during jacking of the wheeled sub-frame whereby jacking of said wheeled sub-frame effects jacking of the scanning station sub-frame of the apparatus.

2. Image scanning apparatus according to claim 1, wherein said wheeled sub-frame and such other sub-frame have mounted thereto co-operating pairs of projections and sockets therefor at least one of the projection and socket of each such pair being at least part tapered with a vertical axis, whereby on jacking, such projections and sockets interengage to provide a self-locating effect for the sub-frames with respect to one another.

3. Image scanning apparatus according to claim 1, wherein said shoulders are provided by a channel member mounted on one said sub-frame and a projection mounted on another said sub-frame to project into the channel member between upper and lower walls thereof, the arrangement being such that when both sub-frames rest on a floor, the projection and channel member are out of contact, whereas lowering of the wheels brings the projection into contact with an upper or lower wall of the channel member whereupon further lowering of said wheels effects jacking of the non-wheeled sub-frame.

4. Image scanning apparatus according to claim 1, wherein said apparatus is enclosed within a substantially light-tight cabinet.

5. Image scanning apparatus according to claim 3, wherein said channel member and projection are so constructed as to provide a light-trap.

6. Image scanning apparatus according to claim 1, wherein the only moving parts carried by said scanning station sub-frame are said scanning means and said means for transporting the recording medium through the scanning station.

7. Image scanning apparatus according to claim 1, wherein the scanning station further comprises means for collecting radiation from the scanned recording medium.

8. Image scanning apparatus according to claim 1, wherein the scanning station is adapted for scanning a plate of the type used in photo-stimulable luminescence (PSL) radiography.

* * * * *